US008364498B2

(12) United States Patent
Sohr et al.

(10) Patent No.: US 8,364,498 B2
(45) Date of Patent: Jan. 29, 2013

(54) HEALTHCARE CLAIM AND REMITTANCE PROCESSING SYSTEM AND ASSOCIATED METHOD (75) Inventors: James M. Sohr, Nashville, TN (US); Darby W. Brown, Belle Meade, TN (US); Steven J. Yurjevich, Franklin, TN (US)

(73) Assignee: OptumInsight, Inc., Eden Prairie, MN (US)

( * ) Notice: Subject to any disclaimer, the term of this patent is extended or adjusted under 35 U.S.C. 154(b) by 1157 days.

(21) Appl. No.: 11/511,658

(22) Filed: Aug. 29, 2006

(65) Prior Publication Data

US 2007/0050219 A1 Mar. 1, 2007

Related U.S. Application Data (60) Provisional application No. 60/712,042, filed on Aug. 29, 2005.

(51) Int. Cl.
*G06Q 10/00* (2012.01)
(52) U.S. Cl. .................... 705/2; 705/3; 705/35; 705/37; 705/40
(58) Field of Classification Search .................. 705/1, 2, 705/3, 4, 11, 40, 21; 707/102
See application file for complete search history.

(56) References Cited

U.S. PATENT DOCUMENTS

| 5,182,705 A * | 1/1993 | Barr et al. ................... 705/11 |
| 5,235,702 A * | 8/1993 | Miller ........................... 707/102 |
| 5,253,164 A * | 10/1993 | Holloway et al. ............... 705/2 |
| 5,704,044 A * | 12/1997 | Tarter et al. .................... 705/4 |
| 5,956,687 A * | 9/1999 | Wamsley et al. ................ 705/1 |
| 6,253,186 B1 * | 6/2001 | Pendleton, Jr. ................. 705/2 |
| 6,343,271 B1 * | 1/2002 | Peterson et al. ................ 705/4 |
| 2001/0047331 A1 * | 11/2001 | Malanga et al. ............... 705/40 |
| 2002/0002495 A1 * | 1/2002 | Ullman ........................ 705/21 |
| 2003/0018496 A1 * | 1/2003 | Hambright et al. ............. 705/2 |
| 2003/0171953 A1 * | 9/2003 | Narayanan et al. ............ 705/2 |
| 2003/0191667 A1 * | 10/2003 | Fitzgerald et al. .............. 705/2 |
| 2003/0195771 A1 * | 10/2003 | Fitzgerald et al. .............. 705/2 |
| 2003/0236747 A1 * | 12/2003 | Sager .......................... 705/40 |
| 2004/0133452 A1 * | 7/2004 | Denny et al. ................... 705/2 |
| 2005/0015280 A1 * | 1/2005 | Gabel et al. .................... 705/2 |
| 2005/0033609 A1 * | 2/2005 | Yang .............................. 705/2 |
| 2005/0102170 A1 * | 5/2005 | Lefever et al. ................. 705/4 |
| 2005/0119918 A1 * | 6/2005 | Berliner ........................ 705/3 |
| 2005/0120039 A1 * | 6/2005 | Amys et al. ................. 707/102 |
| 2005/0182721 A1 * | 8/2005 | Weintraub .................... 705/40 |
| 2005/0261944 A1 * | 11/2005 | Rosenberger ................. 705/4 |

OTHER PUBLICATIONS

Proquest search result, Sep. 27, 2012.*
U.S. Appl. No. 11/140,216, filed May 27, 2005, James W. Sohr et al.

* cited by examiner

*Primary Examiner* — Dilek B Cobanoglu
(74) *Attorney, Agent, or Firm* — Fulbright & Jaworski L.L.P.

(57) ABSTRACT

A system for processing healthcare claims and remittances comprises a database and an electronic portal. The database contains previously received healthcare claims from a plurality of healthcare providers and previously received remittances from a plurality of payers. The electronic portal, connected to the database, receives a healthcare claim from a provider or a remittance from a payer, and splits the received claim or remittance into a plurality of data elements. The portal assigns a unique identifier and a shared identifier to each of the data elements of the received claim or remittance. The portal performs a duplicate claim edit and/or a third party liability edit on the received claim, or performs a duplicate remittance edit an/or a third party payment edit on the received remittance. Based on the result of the edits, the portal submits the received claim to a payer or submits the received remittance to a provider.

39 Claims, 7 Drawing Sheets

HEALTHCARE CLAIM AND REMITTANCE PROCESSING SYSTEM AND ASSOCIATED METHOD

CROSS-REFERENCE TO RELATED APPLICATIONS

This application claims priority to U.S. Provisional Application No. 60/712,042, filed Aug. 29, 2005, the contents of which are incorporated herein in its entirety.

FIELD OF THE INVENTION

Embodiments of the invention relate generally to a healthcare claims processing system. More specifically, embodiments of the invention relate to a healthcare claims processing system capable of identifying duplicate claims and remittances and third party liability claims and remittances.

BACKGROUND OF THE INVENTION

It can be appreciated that automated clearinghouses (i.e., an establishment maintained by a third party with the purpose of settling mutual claims and accounts; a central agency for the transmission and distribution of claims information) have been in use for some period of time, especially for the submission and payment of healthcare claims (i.e., requests for payment for healthcare services provided to a patient; commonly referred to as "bills"). Healthcare claim submission and payment is a process that many have attempted to refine by using some form of claims management software. Specifically, software has previously been offered that can receive claim information from a healthcare provider (e.g., a physician, hospital, or medical laboratory), break the data elements into a standard set, give each claim a unique identifier, submit the claim information to a payer (typically an insurance carrier or a government agency), accept payment (also termed a remittance; a remittance, as is applicable to healthcare, is the payment and explanation of that payment produced by a payer and sent to a provider and comprising the adjudication and payment information) for the claim from the payer, and administer that payment back to the provider, all with limited or even no human interaction.

One common problem with known methods for claims submission occurs when a healthcare provider submits a claim to a payer and does not receive payment of that claim in a timely fashion. The provider, after a period of time, may send out another bill, or "second notice" claim, to the payer. The payer, not realizing that both claims are for the same service, often eventually pays both claims in error, resulting in a duplicate payment to the provider. This problem occurs because both parties (payer and provider) are operating through many disparate systems and do not have access to a transparent set of data. This problem also occurs because the clearinghouse acts merely as a pass-through between the payer and provider, meaning that the clearinghouse only passes information back and forth, and generally does not store claim or remittance information for any significant period of time. Further, these problems also occur because the known methods of claims submission generally include intensive human interaction, providing many opportunities for errors to occur. These problems may also occur due to various computer system (typically software) and/or human errors that cause the same bill to be generated and submitted multiple times in error, in conjunction with both the initial billing and subsequent billings. The administrative cost incurred by both parties to resolve these duplicate claims is significant and raises the cost of healthcare. Duplicate payment may also occur in the absence of duplicate billing—resulting instead from errors in the payers' processing of payments. Duplicate payments remitted via a clearinghouse are typically not detected until after the provider has received the duplicate payment because the clearinghouse has no method by which payments are stored and validated for accuracy against the provider's original or adjusted bill.

Another common problem in known claims management systems involves errors in both claims submission and payment of a third party liability-related claim (i.e., claims for which at least some portion of the amount due is to be paid by a third party payer). The payment of a healthcare claim may be the responsibility of the patient alone, such as if the patient is uninsured or the service provided is not covered by the patient's insurance. The payment of a healthcare claim may be the responsibility of the patient's medical insurance provider, which may be a private insurance carrier or a government agency such as Medicare or Medicaid. The payment of a healthcare claim may be the responsibility of a third party payer, such as a homeowners insurance carrier (e.g., if the patient is injured by falling on an icy sidewalk), an automobile insurance carrier (e.g., if the patient is injured in a car accident), a workers compensation insurance carrier (e.g., if the patient in injured at work), or an excess/supplemental liability insurance carrier (i.e., an insurance company that offers policies that supplement a patient's primary insurance coverage). The payment of a healthcare claim may be the responsibility of any combination of the above-described payers.

The many complexities of the third-party liability claims payment process complicate payment, and carriers often pay an incorrect amount due to a lack of information regarding coordination of benefits between insurance carriers (coordination of benefits refers to a provision within a healthcare reimbursement schedule that provides that, when a patient is covered under more than one insurance plan, the patient is entitled to benefits up to, but not exceeding, the total allowable expense). This breed of administrative error can be much more complex to resolve than a standard duplicate claim, as it is generally necessary to refund and re-bill the claim to resolve the error. This sort of errant claim can also be much more time consuming to resolve, as most providers do not bill what is presumed to be the secondary carrier until payment has been received from the primary carrier. If the provider has submitted the bills in an incorrect coordination of benefits, the provider may be waiting for a remittance from a payer who does not intend to pay (generally because the payer is often able to immediately recognize upon receipt of the claim that the payer is not the primary payer). Additionally, the provider may bill all payers at once and receive an incorrect payment from the secondary payer who has paid as a primary payer due to the incorrect billing. A refund and re-bill is generally required to resolve such problems.

The above described problems result from the manual processes and the lack of transparency between billing and adjudication systems that exist today, and contribute to a disjointed process which results in huge inefficiencies and excessive, but avoidable, administrative costs. When a payer or provider discovers that a claim has been paid incorrectly, either as a duplicate or from incorrect third-party liability reimbursement, the administrative costs incurred to resolve the claim is significant. The standard process generally involves paper letters to the provider from the payer requesting the payment to be refunded, phone calls between payer and provider to resolve various data elements, faxes between each party to provide documentation for discrepancies, and often the usage of data mining and/or collection agencies. Preventing incorrect reimbursement of claims is important to keeping the administrative cost of post-payment resolution of errant claims at a manageable and reasonable amount.

Figure 1:
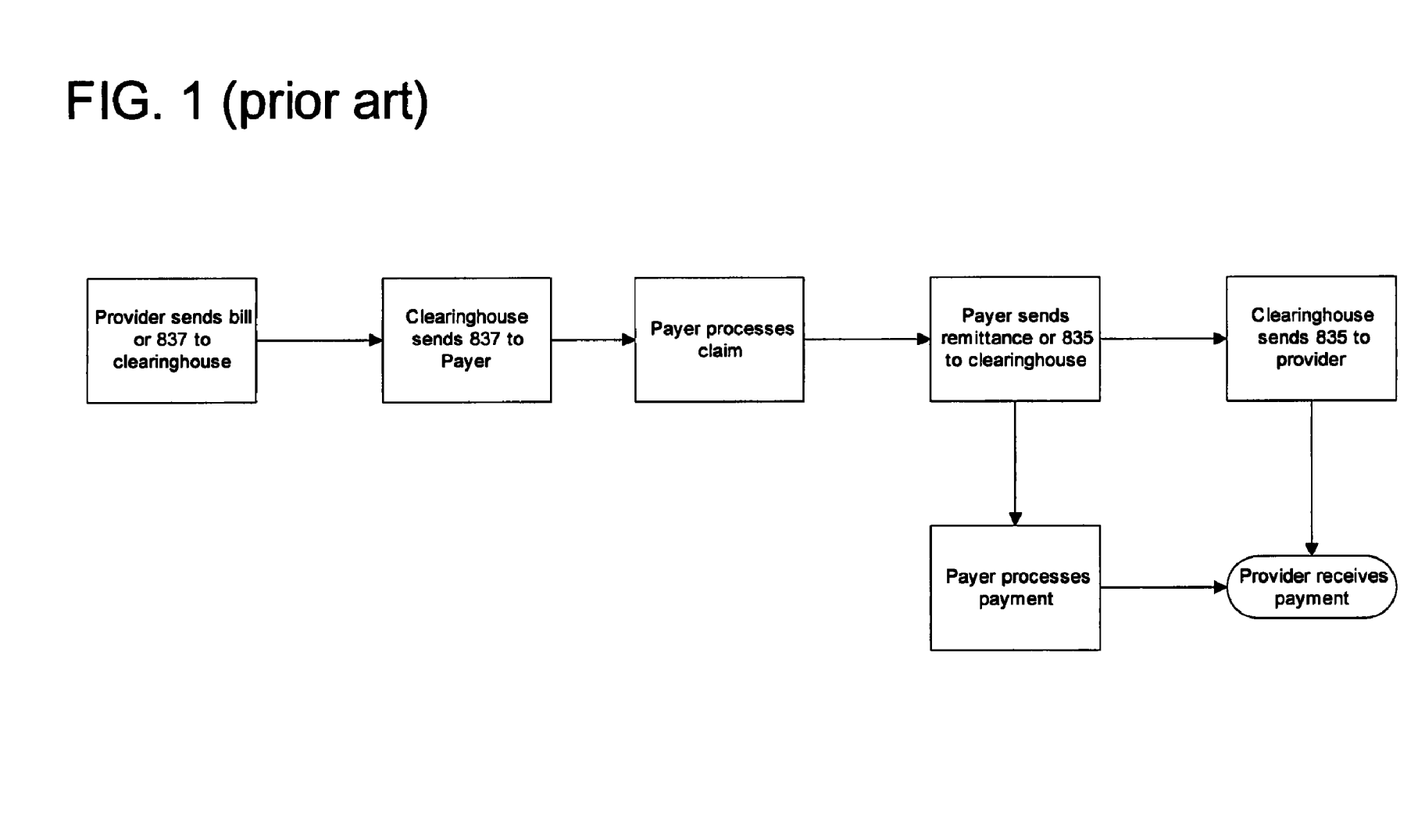
FIG. 1 is a flowchart depicting a typical process in which a provider submits a bill to be paid by the payer through a clearinghouse and the payer submits a remittance back to the provider through a clearinghouse.
Figure 2:
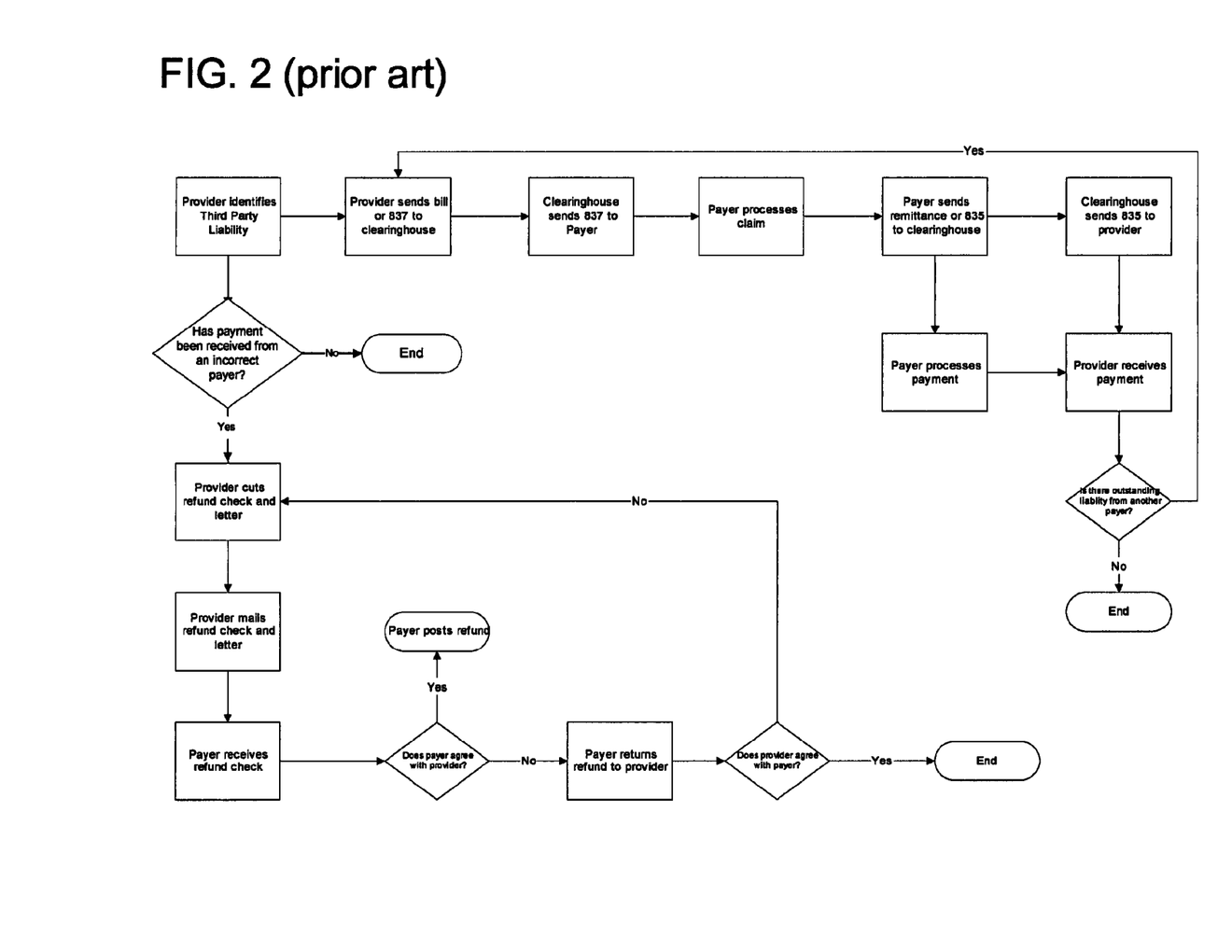
FIG. 2 is a flowchart depicting a typical process in which a provider identifies third party liability related to a claim, and in which the provider refunds money to a misidentified primary guarantor that has already adjudicated and paid on a claim.
Figure 3:
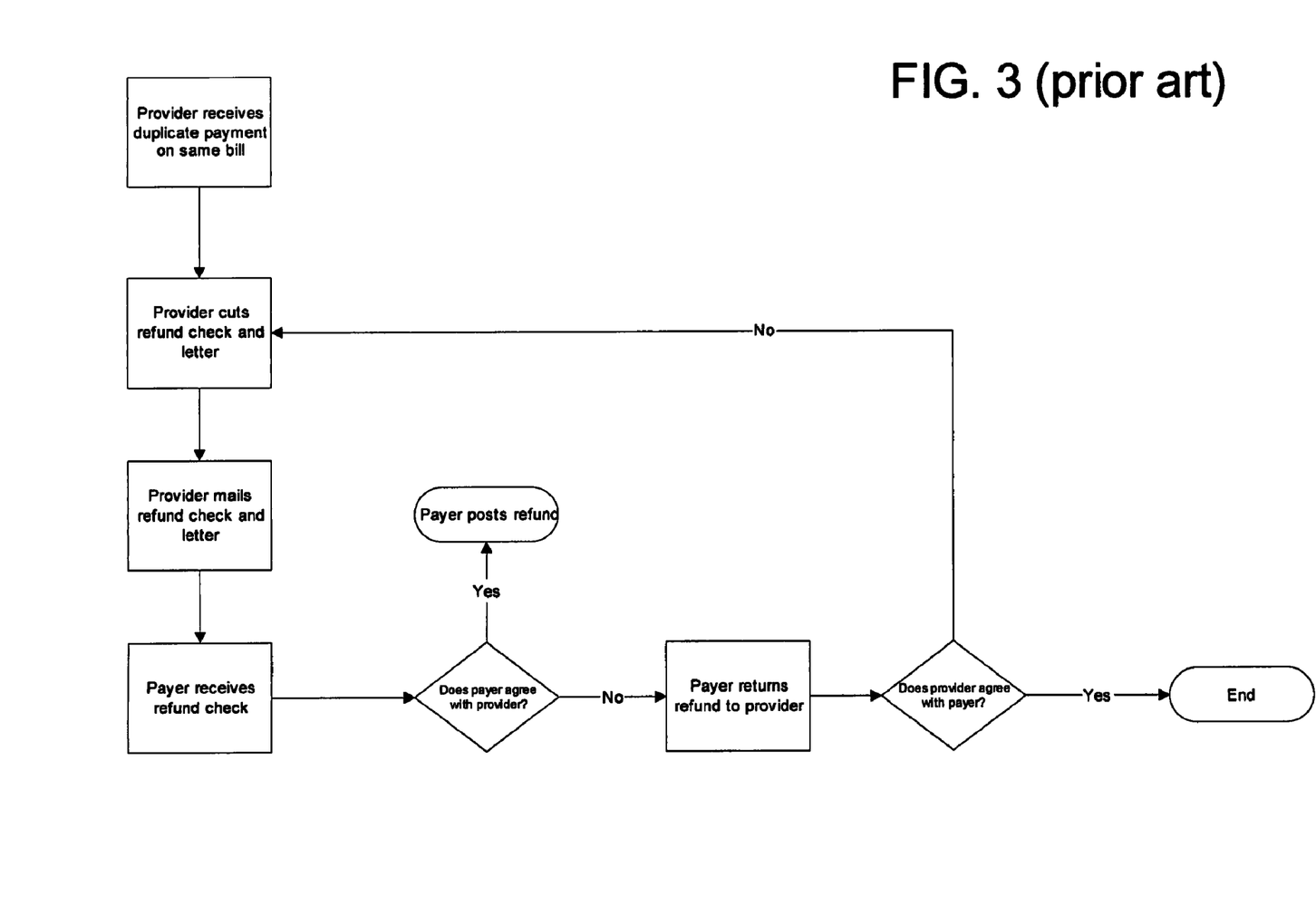
FIG. 3 is a flowchart depicting a typical process in which a provider refunds a duplicate payment to a payer, and in which the payer may refuse the refund and return the refunded money to the payer.
Figure 4:
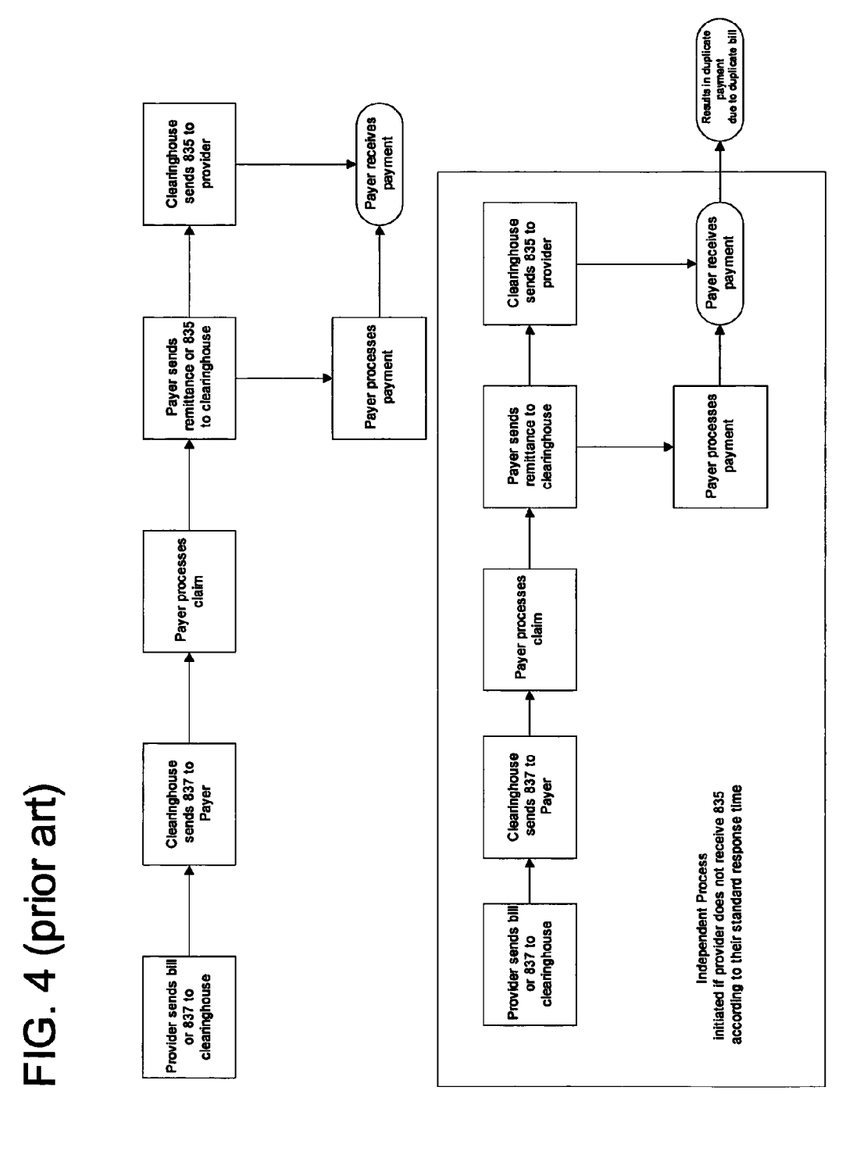
FIG. 4 is a flowchart depicting a typical process in which a provider sends a bill to the payer for adjudication and payment; the flowchart of FIG. 4 also depicts the process in which the provider may submit a duplicate bill if the provider has not received an 835, a remittance, and/or a payment from the payer according to the provider standard timeframes.

These inefficiencies are graphically captured in FIGS. 1-4. The illustrated flowcharts provide graphical examples of what current claim and remittance processing entails, and they also highlight representative problems that may occur during such processing. FIG. 1 is a flowchart depicting the process in which a provider submits a bill to be paid by the payer through a clearinghouse. The flowchart of FIG. 1 also depicts the process in which a payer submits a remittance back to the provider through a clearinghouse. FIG. 2. is a flowchart depicting the process in which a provider identifies third party liability. The flowchart of FIG. 2 also depicts the cumbersome and time-consuming process in which the provider refunds money to a misidentified primary guarantor that has already adjudicated and paid on a claim. FIG. 3. is a flowchart depicting the process in which a provider refunds a duplicate payment to a payer for the same bill. The flowchart of FIG. 3 also depicts the process in which the payer may deny the refund and send the refunded money back to the payer. FIG. 4. is a flowchart depicting the process in which a provider sends a bill to the payer for adjudication and payment. The flowchart of FIG. 4 also depicts the process in which the provider may submit a duplicate bill if the provider has not received an 835, remittance and/or payment from the payer according to the provider standard timeframes. As can be appreciated by reviewing FIGS. 1-4, the prior art comprises a disjointed process which results in huge inefficiencies and excessive, but avoidable, administrative costs. The prior art figures only capture examples of prior art methods. The figures are thought to be helpful in understanding the applicant's invention and how it improves upon the prior art techniques.

BRIEF SUMMARY OF THE INVENTION

The object of the present invention is to overcome the aforementioned drawbacks and to provide a scalable healthcare claim and remittance processing system that functions as a clearinghouse and data warehouse portal, having the ability to identify and prevent duplicate claims and duplicate remittances, and to identify and correct errors in third-party liability claims and remittances.

In one embodiment of the invention, a system for processing healthcare claims and remittances comprises a database and an electronic portal. The database contains previously received healthcare claims from a plurality of healthcare providers and previously received remittances from a plurality of payers. The electronic portal, connected to the database, receives a healthcare claim from a healthcare provider and splits the received claim into a plurality of data elements. These data elements comprise at least a patient identifier, a healthcare provider identifier, a date of service, and an amount payable. The electronic portal may assign a unique identifier and a shared identifier to each of the data elements of the received claim. The electronic portal performs a duplicate claim edit and/or a third party liability edit on the received claim. Based on the result of the duplicate claim edit and/or the third party liability edit, the electronic portal submits the received claim to a payer. The electronic portal may provide the plurality of data elements and associated unique and shared identifiers to the database to be stored. The electronic portal may set a status indicator for each of the plurality of data elements of the received claim to indicate that the claim has been submitted to the payer.

Performing the duplicate claim edit may comprise searching the database for a previously received claim that has a same patient identifier and a same date of service as the received claim and that has a status indicator indicative of having been submitted to the payer. The electronic portal may submit the received claim to the payer only if the database does not contain a previously received claim that has the same patient identifier and the same date of service as the received claim and that has a status indicator indicative of having been submitted to the payer. The electronic portal may notify the healthcare provider if the database contains a previously received claim that has the same patient identifier and the same date of service as the received claim and that has a status indicator indicative of having been submitted to the payer.

Performing the third party liability edit may comprise determining if one or more third party payers is responsible for paying at least a portion of the amount payable associated with the received claim. Determining if one or more third party payers is responsible for paying may comprise at least one of: (a) determining if the received claim contains a third party liability indicator; (b) comparing an insurance carrier listed on the received claim to a stored list of insurance carriers that exclusively function as third party payers; (c) sending a third party liability inquiry to a payer associated with the received claim; or (d) searching the database for previously received healthcare claims corresponding to the same patient identifier as the received claim, and determining if any such previously received claims are associated with a third party payer. If at least two third party payers are responsible for paying a portion of the amount payable associated with the received claim, the third party liability edit may determine which of the third party payers is a primary payer and which is a secondary payer. If at least three third party payers are responsible for paying a portion of the amount payable associated with the received claim, the third party liability edit may determine which of the third party payers is a tertiary payer. The received claim may then be submitted to the primary payer.

The electronic portal may determine if any necessary data is missing from the received claim and send a missing data request to the healthcare provider. The electronic portal may receive missing data from the healthcare provider and split the received missing data into a plurality of data elements. The electronic portal may then assign a unique identifier and the shared identifier to each of the plurality of data elements of the missing data. By assigning the shared identifier to the missing data elements, the missing data elements are associated with the original claim.

The electronic portal may resubmit the received claim to the payer and notify the healthcare provider of the resubmission if a predetermined amount of time has elapsed since the received claim was submitted to the payer.

The electronic portal may receive a remittance from a payer and split the received remittance into a plurality of data elements, the data elements comprising at least a patient identifier, a healthcare provider identifier, a date of service, and an amount being paid. The electronic portal may then assign a unique identifier and the shared identifier to each of the plurality of data elements of the received remittance. The electronic portal may then perform a duplicate remittance edit and/or a third party payment edit on the received remittance. Based on the result of the duplicate remittance edit, the electronic portal may submit the received remittance to the healthcare provider. The electronic portal may store the plurality of data elements and associated unique and shared identifiers in the database. The electronic portal may set a status indicator for each of the plurality of data elements of the received remittance to indicate that the remittance has been submitted to the healthcare provider.

Performing the duplicate remittance edit may comprise searching the database for a previously received remittance that has a same patient identifier and a same date of service as the received remittance and that has a status indicator indicative of having been submitted to the healthcare provider. The electronic portal may submit the received remittance to the healthcare provider only if the database does not contain a previously received remittance that has the same patient identifier and the same date of service as the received remittance and that has a status indicator indicative of having been submitted to the healthcare provider. The electronic portal may notify the payer if the database contains a previously received remittance that has the same patient identifier and the same date of service as the received remittance and that has a status indicator indicative of having been submitted to the healthcare provider.

Performing the third party payment edit may comprise determining if any portion of the amount payable remains outstanding after receiving the remittance and determining if one or more third party payers is responsible for paying the outstanding portion. If one third party payer is responsible for paying the outstanding portion, the electronic portal may submit a claim for the outstanding portion to the one third party payer responsible for paying the outstanding portion. If two or more third party payers are responsible for paying the outstanding portion, the electronic portal may submit a claim for the outstanding portion to the third party payer having primary responsibility to pay the outstanding portion.

In addition to the system for processing healthcare claims and remittances as described above, other aspects of the present invention are directed to corresponding methods and computer program products for processing healthcare claims and remittances.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Turning now to a more detailed description of the present invention, there is first illustrated in FIGS. 1-4 embodiments of known claim and remittance processing methods that are helpful in understanding the present invention. The exact and full methodologies for this type of manual claim and remittance processing need not be described in extensive detail herein inasmuch as such in-depth details are known to those skilled in the art, and the details are evident given the illustrations. Moreover, the processes illustrated by flowchart in FIGS. 1-4 are merely exemplary. The present invention provides a system that simplifies and improves upon a wide-range of prior art transactions and need not be strictly associated with the illustrated prior art embodiments.

FIGS. 1-4, being known techniques for resolving post-payment claims, are thought to be self-explanatory. Overall, the flowcharts of FIGS. 1-4 detail the inefficiencies in a traditional claim and remittance processing system. A number of process steps are illustrated in order to understand the refined process and system of the present invention. These steps do not require further discussion here. As illustrated, known techniques fail to detect errors in claim and remittance processing prior to the submission of the claim to the payer or the remittance to the provider. Thus, errors in claim and remittance processing result in duplicative and time-consuming administrative efforts to resolve.

Embodiments of the present invention, which will be described subsequently in greater detail, provide a scalable claim transmission and remittance system and associated method that functions as a clearinghouse and data warehouse portal. Systems and methods of embodiments of the invention have the ability to identify duplicate claims and third-party liability claims and automatically identify preventative action for errors in payment of each for such claims, thereby resolving healthcare claim discrepancies and disputes among multiple healthcare payers and providers. Embodiments of the invention have many of the advantages of the claims clearinghouse portals mentioned heretofore, as well as novel features that result in storing data for the purpose of identifying duplicate paid claims or claims involving inaccurate third-party liability processing. The scalable solution provided by embodiments of the invention can be applied in both a pre- and post-adjudication model, greatly reducing the administrative cost of claim submission, claim payment, and claim resolution.

Embodiments of the invention allow multiple healthcare providers, payers, insurance companies, carriers, Health Maintenance Organizations (HMOs), Independent Physician Associations (IPAs), government entities, self-insured companies, Third Party Administrators (TPAs), and other authorized entities to participate in the resolution process related to medical claims in a pre- or post-payment environment.

Embodiments of the invention allow these entities to view and work from a transparent set of data, as the system records each account (as used herein, an account refers to a unique patient encounter with a particular provider) in a standard fashion by creating a unique identifier for each claim data element and a shared identifier that links the provider bill with the payer remittance. All claim and remittance activity may be monitored for all related or duplicate accounts, thereby automatically preventing claim and remittance processing errors before they occur, both on the front end and the back end of the adjudication process. All related entities are able to work from a common set of data to take steps to quickly and concurrently resolve financial transaction issues.

Embodiments of the invention function as a neutral transaction platform, with a data warehouse portal that stores all data elements with unique identifiers and operates as a common and shared intermediary system between multiple payer and multiple provider platforms. A data warehouse of claims information is maintained that is extracted from multiple providers, multiple payers, and other entities in order to streamline and improve the workflow process. The term "data warehouse" is generally understood to refer to a collection of computerized data, organized for optimal reporting and analysis. The terms data warehouse and database are used interchangeably herein. Embodiments of the invention electronically collect and store relevant data in the data warehouse from the provider bill and the payer remittance. This relevant data generally is not stored as intact claims and remittances (i.e., as submitted by providers and payers, respectively), but rather as "objects," or separate data elements that together comprise a claim or remittance.

Figure 5:
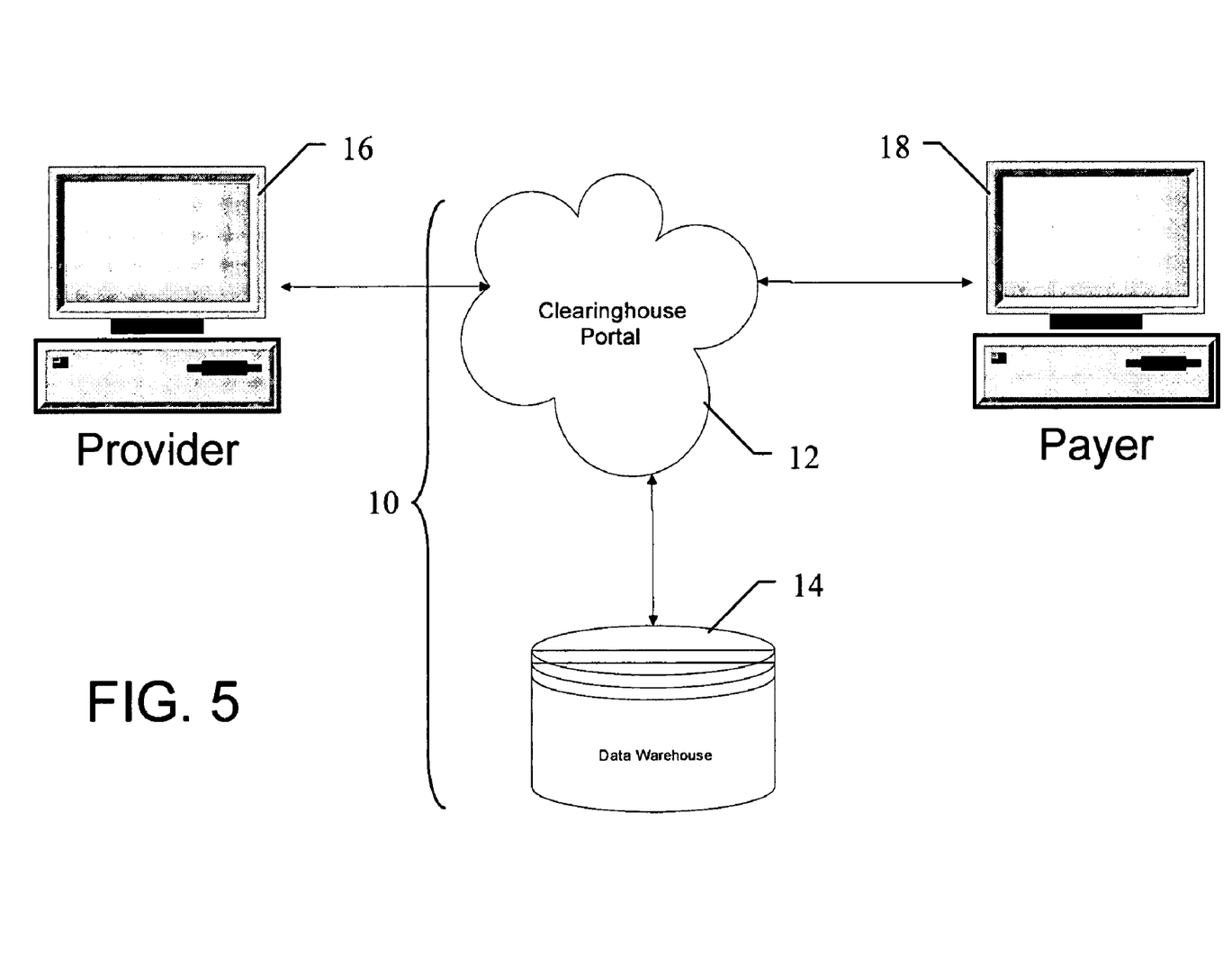
FIG. 5 illustrates a block diagram of a healthcare claim and remittance processing system, in accordance with one embodiment of the invention.

Referring now to FIG. 5, a block diagram of a healthcare claim and remittance processing system is illustrated, in accordance with one embodiment of the invention. The system 10 comprises an electronic portal 12 and a data warehouse 14. A plurality of healthcare providers 16 and payers 18 may be in communication with the electronic portal.

The portal is typically Internet-based (also termed web-based), such that communication between the portal and the users (i.e., the providers and payers) occurs via the Internet, although communication may also occur via any suitable secure communications media, such as virtual private network (VPN). The communication typically occurs over a browser-based connection (i.e., Internet, Intranet, or Extranet) and will, therefore, have inherent security measures. The portal of embodiments of the invention receives provider claims and payer remittances. The claims and remittances are preferably transmitted electronically, although hard copy (i.e., paper) claims and remittances may be received and processed. Hard-copy claims and remittances are typically loaded into the system manually, such as by scanning and performing optical character recognition (OCR). While the preferred operation is "real time," upload processes such as "dialup" can also be accommodated by embodiments of the invention. Moreover, the present invention can accommodate individual claim entry as well as batch processing. Once the data warehouse receives the raw data from the provider, receipt of the claim or remittance may be automatically confirmed.

Embodiments of the invention meet or exceed all current state and federally mandated transaction requirements, including, but not limited to, those requirements set forth pursuant to the Health Insurance Portability and Accountability Act of 1996 (HIPAA). It is envisioned that the system could be modified to conform to future statutory requirements.

The electronic claims submitted by the providers and the electronic remittances submitted by the payers typically contain standardized segments, data elements, and codes that designate usage, reference destinations, name, and attributes that would be used. Paper claims (e.g., a UB-92 or a HCFA 1500 form) typically contain standardized fields with each data field identified by a unique numeric identifier and title. Although, similar information can be found on remittances, in general, remittance data formats can vary between payer organizations and are typically identified by a header row.

The claim that is generated by the electronic portal and sent to a payer typically conforms to the 837 HIPAA Transaction Set (termed by HIPAA as a "Health Claims & Equivalent Encounter Information and Coordination of Benefits"). The remittance that is generated by the electronic portal and sent to a provider typically conforms to the 835 HIPAA Transaction Set (termed by "HIPAA as a Health Care Payment/Remittance Advice" (EFT/ERA)). Herein, a claim may be alternatively referred to as an 837, and a remittance may be alternatively referred to as an 835. Claims and remittances that are transmitted to the electronic portal from providers and payers, respectively, may already conform to their respective HIPAA transaction set. Alternatively, embodiments of the invention may use the data elements received in non-standard claims and remittances to create claims and remittances that conform to the HIPAA standards for transmission to the providers and payers.

The electronic portal splits the claims and remittances into separate data elements for input into the data warehouse. A unique identifier is created for each claim data element, and a shared identifier is created that links payer and provider and that contains references to the individual payer, provider, and patient encounter data elements for any individual transaction or group of transactions for the same individual. Each data element will typically be assigned a status identifier that reflects status of the claim or remittance, in terms of action that have been performed on the claim or remittance, such as the respective submission and subsequent response from the other party (example status identifiers may include "submission," "submission response," "status," and "status response"). Each data element will typically be assigned a monetary amount associated with the particular transaction. The data elements, along with the unique and shared identifiers and the status identifiers, are stored in the database. The individual data elements create standard packets of information that, when re-compiled, can reproduce the claim or remittance.

Embodiments of the invention generally have the ability to determine if any additional information is needed to generate an 837 HIPAA Transaction Set from the received claim or an 835 HIPAA Transaction Set from the received remittance and to send a request for additional information back to the entity that submitted the claim or remittance. Upon receipt of the missing data, the system will assign a unique identifier to the new data elements, link the new data elements to the shared identifier, and store the new data elements in the database. If the bill is received electronically, the system will typically send an electronic request to the provider for information detailing the missing data elements necessary to generate the 837. If the bill is received as a hard copy document, the system will typically send a hard copy request to the provider detailing the missing data elements necessary to generate the 837.

As used herein, the term "edit" refers to a predefined procedure that is performed on the claim and/or remittance data in which, for example, the format and content of the received and/or stored data is checked to determine if the data conforms to the requirements of the system, or the received and/or stored data is analyzed to determine which subsequent procedure(s) should be performed by the system. As described further herein, a plurality of edits may be performed on the claim and/or remittance data to ensure correct claim and remittance processing, thereby preventing errors which may be time-consuming and expensive to remedy.

Embodiments of the invention may perform an edit on the received claim to determine if any of the billed procedures are procedures for which Medicare will not reimburse the providers (these procedures are termed "Medicare defined disallowed services"). If any of the billed procedures are not reimbursable by Medicare, the system will typically notify the provider of the incorrect bill and will not transmit the 837 to the payer.

Inefficiencies in known claims processing systems also exist when a provider does not receive timely payment for a bill and must send a request for claim status to the payer. Embodiments of the invention may track the elapsed time since the 837 was sent to the payer and, after a predetermined amount of time has passed, automatically send a payment status request to the payer and notify the provider that a payment status request has been sent.

Embodiments of the invention are able to link multiple remittances from multiple payers to single or multiple bills for the same service. When a provider submits a primary bill, secondary bill, and tertiary bill for a given claim, the system generates a separate, unique 837 for each bill but also creates a related shared identifier that links those separate bills to the claim. For the same claim, a primary payer remittance, a secondary remittance, and a tertiary remittance may be received by the system and a separate, unique 835 will be created for each remittance with the same shared identifier assigned to the remittances to link them to the same original claim. This capability allows for all 837s or 835s for a particular claim to be viewed when any one of the primary, secondary, or tertiary 835s or 837s is viewed for that particular claim, thereby reducing errant claims with respect to third-party liability issues. The data warehouse element of the system enables an erroneous claim to be corrected prior to submitting an 837 to a payer and allows an erroneous remittance to be corrected prior to submitting an 835 to the provider.

Embodiments of the invention function as a healthcare claim tracking system through one central data warehouse, accessible through an electronic portal. This system benefits both the healthcare provider and the healthcare payer by performing one or more edits on the received claim (e.g., a duplicate claim edit and a third party provider edit, as discussed in detail below) and by performing one or more edits on the received remittance (e.g., a duplicate remittance edit and a third party payment edit, as discussed in detail below), thereby reducing claim and remittance errors and reducing administrative costs for payers and providers.

Once the bill or remittance is broken down into separate data elements, a number of different edits may be performed to detect and correct errors. For example, a duplicate claim edit may be performed that is capable of detecting a duplicate claim by searching the database for a previously received claim having one or more data elements in which the data is the same as that of the newly received claim. For example, the duplicate claim edit may search the database for a previously received claim having the same patient number, the same date of service, the same procedure code, and the same amount due (for the same procedure) as the newly received claim, although it should be appreciated that the number of data elements used may vary and the specific data elements used may vary. If such a previously received claim is discovered, then the newly received claim is marked as a duplicate. Although the term "procedure code" is used herein, this code may in fact refer to procedures or services performed for a patient or may refer to products, supplies, or equipment used in the care of a patient. The procedure code is an industry-standard numeric or alphanumeric code indicative of the type of service or procedure performed by the provider. One such procedure code is the "revenue code," and another such procedure code is the "Current Procedural Terminology" (CPT) code. (The CPT codes are also referred to as Level I of the Healthcare Common Procedure Coding System (HCPCS). Level II of the HCPCS also defines a different set of procedure codes which may be used in embodiments of the invention.) Revenue codes are a set of three-digit codes that identify hospital services. CPT codes are a set of five-digit codes that identify medical services. If a received claim is determined to be a duplicate, the claim is not submitted to the payer and notification is sent to the provider that submitted the duplicate claim. The system stores the duplicate transaction through the same standard fashion of assigning unique identifiers to the data elements as previously discussed. If desirable, a human can intervene in the process and review a "suspect" duplicate claim prior to notification through a "suspect" duplicate work queue.

As an example of performing a duplicate claim edit, consider a bill submitted by a provider on Aug. 1, 2006, with total charges of $2,000.00 (Rev Code 123 for $1,500.00 and Rev Code 456 for $500.00), for patient account number 987654321, and for dates of service Jul. 15, 2006-Jul. 16, 2006. Upon successfully processing the claim initially, an 837 is submitted to the payer, and the status of each data element is recorded in the data warehouse as being submitted. Consider if the provider then submits a bill on Sep. 1, 2006, with total charges of $5,000.00 (of Rev Code 123 for $1,500.00 and Rev Code ABC for $3,500.00), for patient account number 987654321, and for dates of service Jul. 15, 2006-Jul. 16, 2006. Upon performing the duplicate claim edit, the system will determine that Rev Code 123 for $1,500.00 has already been submitted to the provider. Thus, this portion of the newly submitted claim would be determined to be a duplicate and would not be submitted to the payer. However, the bill for $3,500.00 for Rev Code ABC would be determined to have not been previously submitted to the payer, and an 837 for that service would be generated and submitted to the payer.

As another example of edits that may be performed to detect and correct errors, a third party liability edit may be performed on a received claim. The third party liability edit may determine if a received claim involves third party liability using several different methods. For example, the third party liability edit may determine if a third-party liability indicator exists on the received claim. Certain third party liability indicators exist on a providers' standard bill (such as a UB92 or HCFA 1500 form). Alternatively, the third party liability edit may query other previously received claim submissions with the same patient demographic information that are stored in the data warehouse. If prior claims for the same patient involved third party liability, it is likely that new claims also involve third party liability. Another method to determine third party liability is by referencing a diagnosis code included in the claim, as the specific diagnosis may be indicative of third party liability. For example, diagnosis codes E813.0 and E819.0 indicate an injury resulting from a motor vehicle traffic accident and thus may be indicative of third party liability (i.e., coverage from an automobile insurance policy). Another method to determine third party liability is to compare the insurance carrier listed on the claim against a database of insurance carriers who only handle third party liability claims (e.g., a workers compensation carrier or an automobile insurance carrier). By maintaining a database of carriers or any health insurers that only administer third party liability coverage, the system mitigates the provider error of not using a third party liability indicator when appropriate on the bill. By utilizing a database of carriers or any health insurers that only administer third party liability coverage, the invention removes the need for a third party liability indicator to trigger the coordination of benefits (COB) process. Another method to determine third party liability is to utilize standard "270/271 transaction sets," which are typically used for patient eligibility inquiry and response. The system may send a 271 (inquiry) to the payer on behalf of the provider to determine if third party liability is involved. The payer may send a 270 (response) back to confirm or deny third party liability.

If any of the above methods indicate the involvement of third party liability, the claim will be flagged for validation the correct coordination of benefits (COB) for such claims, prior to the claim being submitted for payment. As described above, COB refers to a provision within a healthcare reimbursement schedule that provides that, when a patient is covered under more than one group insurance plan, the patient is entitled to benefits up to, but not exceeding, the total allowable expense. Further, COB involves determining which payer has primary liability for a claim, which payer has secondary liability, which payer has tertiary liability, and so forth. An 837 may then be submitted to the payer determined to be the primary payer. As discussed below, submission of an 837 to the secondary payer, if required, will typically occur after a remittance is received from the primary payer, and submission of an 837 to the tertiary payer, if required, will typically occur after a remittance is received from the secondary payer. Issues such as payment in the incorrect coordination of benefits and zero-payment remittances, etc. can be avoided by validating COB on the front-end.

As another example of edits that may be performed to detect and correct errors, a duplicate remittance edit may be performed on a received remittance. The duplicate remittance edit functions in a similar fashion to the duplicate claim edit. For example, a duplicate remittance edit may be performed that is capable of detecting a duplicate remittance by searching the database for a previously received remittance having one or more data elements in which the data is the same as that of the newly received remittance. For example, the duplicate remittance edit may search the database for a previously received remittance having the same patient number, the same date of service, and the same amount due (for the same procedure) as the newly received claim, although it should be appreciated that the number of data elements used may vary and the specific data elements used may vary. If a received remittance is determined to be a duplicate, the remittance is not submitted to the provider and notification is sent to the payer that submitted the duplicate remittance.

As another example of edits that may be performed to detect and correct errors, a third party payment edit may be performed on a received remittance. Upon receipt and validation of a primary payer's 835, the third party payment edit will determine if there is outstanding liability (i.e., a balance due) on the claim. If outstanding liability still exists, the third party payment edit may perform an additional validation of the secondary payer, or may use the secondary payer determined during the third party liability edit discussed above. The system will automatically create and submit an 837 to the secondary payer, while also sending the remittance received from the primary payer to the provider. The 837 that is submitted to the secondary payer would not request payment for the full amount of the claim, but rather only for the amount of the outstanding liability. Upon receipt and validation of the secondary payer's 835, the system will perform the same series of validation checks as previously described and automatically create and submit an 837 to the tertiary payer, while also sending the remittance received from the secondary payer to the provider.

The system is capable of sending a stop payment notice to the payer if a remittance fails the duplicate remittance edit or the third party payment edit. The system is also capable of adjusting the remittance to correct any errors prior to issuance to the provider. This capability of the system allows for duplicate payment and third-party liability payment issues to be corrected without having the payment sent to the provider and aides in resolving healthcare claims discrepancies and disputes among multiple payers and providers and reduces the overall cost of healthcare.

Embodiments of the invention have the ability to provide root cause analysis, error resolution, and detailed drill down reporting. The system may assign error codes to individual claims that will enable error resolution, as well as leading to root cause analysis and error trending. Through the detailed drill down reporting, the system may provide benchmarking for individual payer and provider relationships, for single provider and multiple payer relationships, for single payer and multiple provider relationships, and for multiple provider and multiple payer relationships.

Thus, the present invention allows common or shared payment claim level tracking, as both providers and payers can identify an account via a shared identifier through the electronic portal. Because the present invention allows providers and payers to track and resolve duplicate claims and third-party claims on the same system through the portal, claim-level tracking is less time consuming and less expensive. The invention enables earlier identification of root cause problems related to duplicate claims and third party claims on the front end and back end of the claims process, and facilitates the correction of these problems resulting in fewer billing or payment errors and lower administrative costs.

Figure 6:
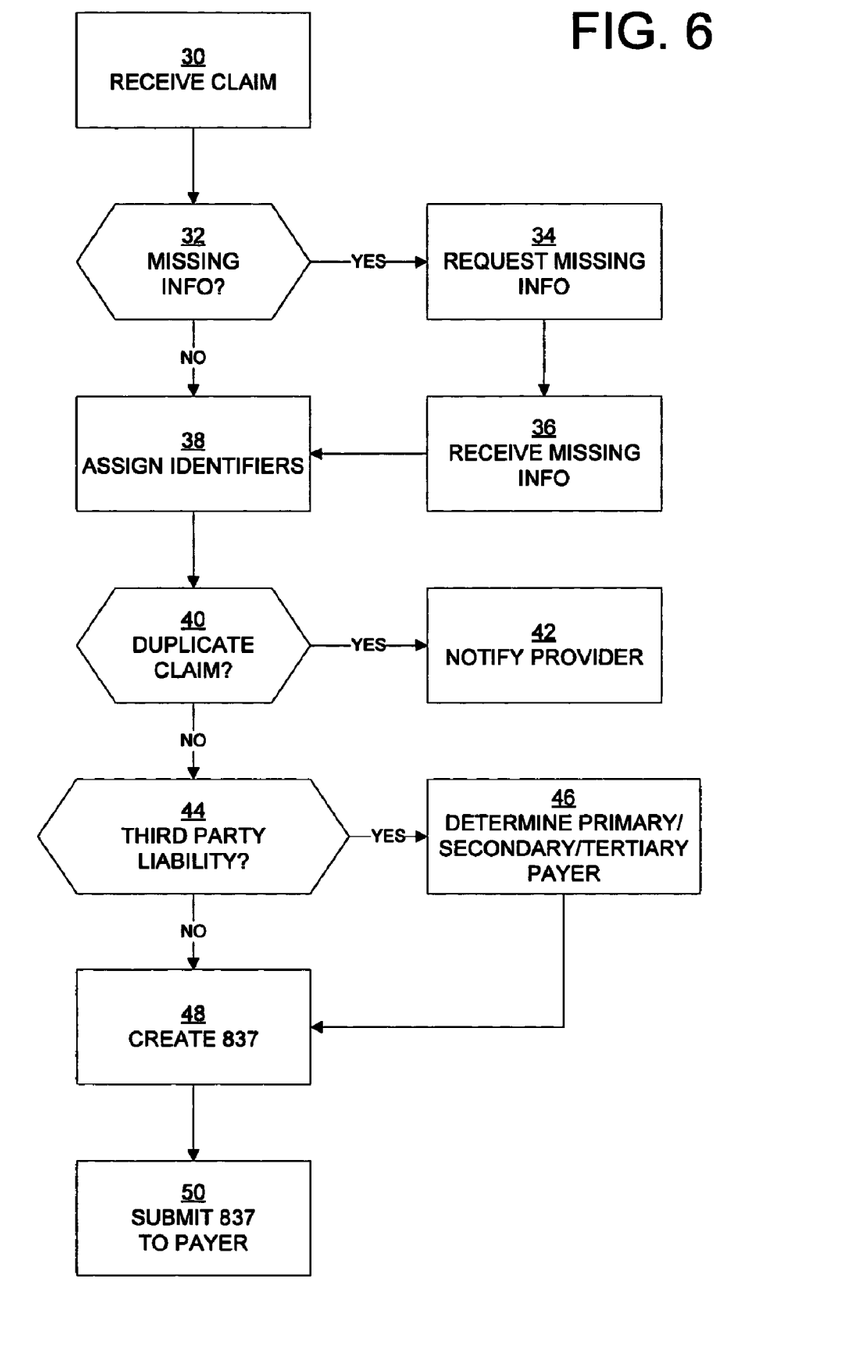
FIG. 6 is a flowchart depicting the receipt and processing of a claim, in accordance with one embodiment of the invention.
Figure 7:
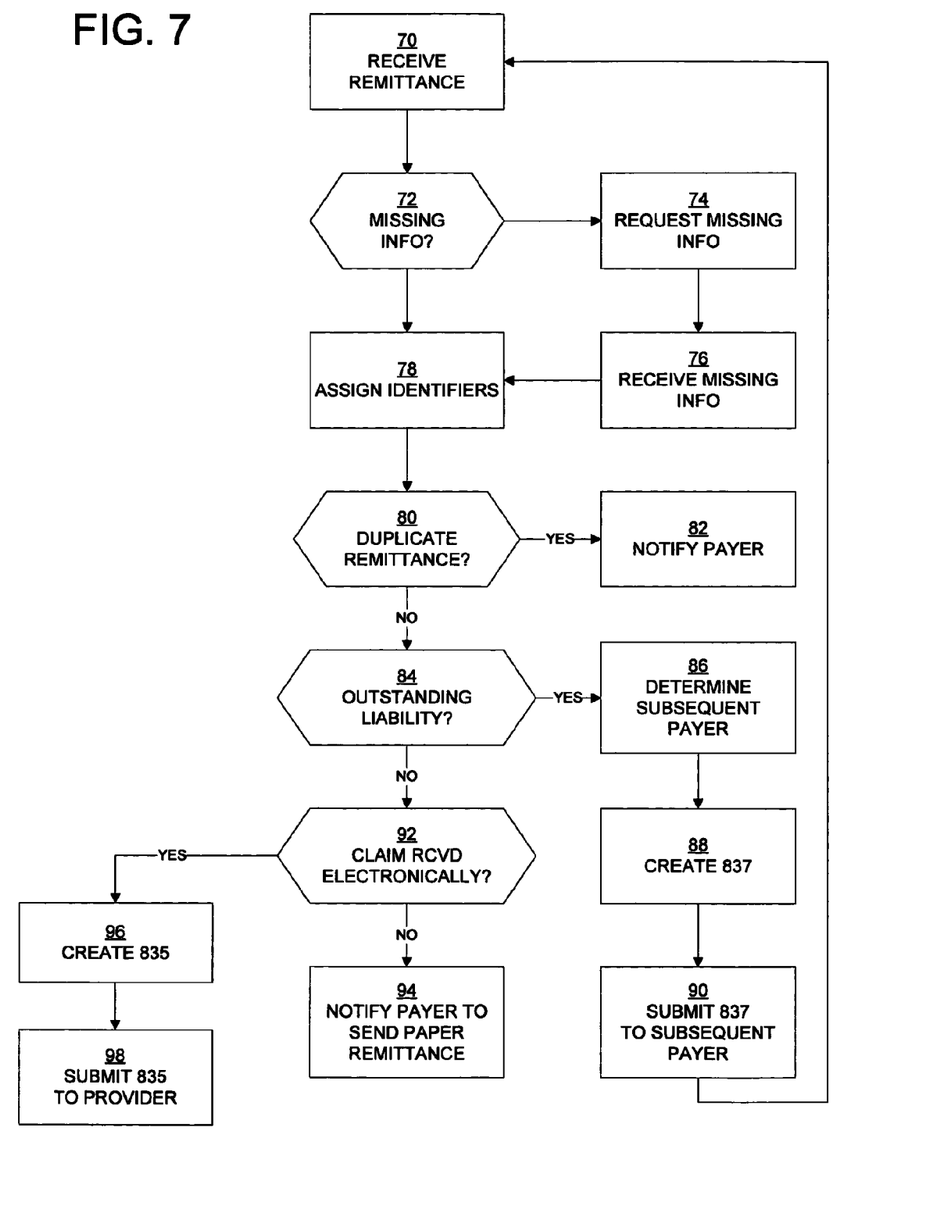
FIG. 7 is a flowchart depicting the receipt and processing of a remittance, in accordance with one embodiment of the invention.

FIGS. 6 and 7 illustrate typical claim and remittance processing, using features of embodiments of the invention described in detail above. FIG. 6 is a flowchart depicting the receipt and processing of a claim, in accordance with one embodiment of the invention. A healthcare claim may be received from a healthcare provider by a clearinghouse. See block 30. The claim may be received electronically via the electronic portal 12 of FIG. 5. Alternatively, a paper claim may be received and scanned as described above. The claim will typically be checked to determine if any information that is necessary to process the claim is missing. See block 32. Regardless of whether information is determined to be missing, the electronic portal splits apart the claim into separate data elements and assigns unique and shared identifiers to the data elements. See block 38. If information is determined to be missing, a request for the missing information may be sent to the provider. See block 34. The missing information request would typically be sent electronically if the claim was received electronically, and the missing information request would typically be sent via hard copy if a hard copy claim was received. When the missing information is received, see block 36, the electronic portal splits apart the newly received information into separate data elements and assigns unique and shared identifiers to the newly received data elements. See block 38. Although not illustrated, the received claim is stored as separate data elements in the data warehouse. The electronic portal may then perform a duplicate claim edit, as described in detail above, to determine if the received claim is a duplicate of a previously received claim that is stored in the data warehouse. See block 40. If the received claim is determined to be a duplicate claim, the provider is notified and the claim is not submitted to a payer. See block 42. If the claim is not a duplicate, additional edits may be performed. For example, a third party liability edit may be performed to determine the appropriate primary, secondary, and tertiary payers. See block 46. An 837 is created for the appropriated payer, see block 48, and the 837 is submitted to the payer, see block 50.

FIG. 7 is a flowchart depicting the receipt and processing of a remittance, in accordance with one embodiment of the invention. A healthcare remittance may be received from a payer by a clearinghouse. See block 70. The remittance will typically be checked to determine if any information that is necessary to process the remittance is missing. See block 72. Regardless of whether information is determined to be missing, the electronic portal splits apart the remittance into separate data elements and assigns unique and shared identifiers to the data elements. See block 78. If information is determined to be missing, a request for the missing information may be sent to the payer. See block 34. When the missing information is received, see block 76, the electronic portal splits apart the newly received remittance data into separate data elements and assigns unique identifiers to the data elements and assigns the same shared identifier as was assigned to the corresponding claim and to the originally received remittance data. See block 78. Although not illustrated, the received remittance is stored as separate data elements in the data warehouse. The electronic portal may then perform a duplicate remittance edit, as described in detail above, to determine if the received remittance is a duplicate of a previously received remittance that is stored in the data warehouse. See block 80. If the received remittance is determined to be a duplicate remittance, the payer is notified and the remittance is not submitted to the provider. See block 82. If the remittance is not a duplicate, additional edits may be performed. For example, a third party payment edit may be performed. See block 86. The third party payment edit will typically determine if there is an outstanding liability remaining on the claim. If so, the third party payment edit will determine if a subsequent payer is liable for the outstanding liability. See block 86. For example, if the received remittance is from a primary payer on the claim, then the third party payment edit will determine if there is a secondary payer liable for the outstanding liability. If the received remittance is from a secondary payer on the claim, then the third party payment edit will determine if there is a tertiary payer liable for the outstanding liability. An 837 will then be created, see block 88, and submitted to the appropriate subsequent payer, see block 90. The electronic portal will process the remittance for submittal to the provider. The electronic portal will typically determine if the original claim was received from the provider electronically or via hard copy. See block 92. If the original claim was received via hard copy, the electronic portal will typically notify the payer to send a hard copy remittance to the provider. See block 94. If the original claim was received electronically, the electronic portal will typically create an 835, see block 96, and submit the 835 electronically to the provider, see block 98.

The method of processing healthcare claims and remittances may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the processing element of the server. With respect to the above description, it is to be realized that the computer program product for the elements of the invention is deemed to be readily apparent and obvious to one skilled in the art.

In this regard, FIGS. 6 and 7 are flowcharts of methods and program products according to the invention. It will be understood that each step of the flowchart, and combinations of steps in the flowchart, can be implemented by computer program instructions. These computer program instructions may be loaded onto one or more computers or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

The system is capable of automatically detecting a duplicate claim or an incorrect third-party claim. This prevents the submission of duplicate claims and improper submitted third-party claims to the payer. This in turn prevents duplicate claim payments and improper third-party liability payments from being sent to the provider. This prevention of errant claims and remittances reduces healthcare claim discrepancies and disputes among multiple payers and providers and reduces the overall cost of healthcare.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for processing healthcare claims and remittances, the system comprising:
    a database containing previously received healthcare claims from a plurality of healthcare providers and previously received remittances from a plurality of payers; and
    an electronic portal connected to the database, the electronic portal configured to receive a healthcare claim from a healthcare provider and to split the received claim into a plurality of data elements, the data elements comprising at least a patient identifier, a healthcare provider identifier, a date of service, and an amount payable;

the electronic portal further configured to determine if any necessary data is missing from the received claim and to send a missing data request to the healthcare provider;

the electronic portal further configured to perform a duplicate claim edit and a third party liability edit on the received claim, wherein the third party liability edit comprises determining if one or more third party payers is responsible for paying at least a portion of the amount payable associated with the received claim, and wherein determining if the one or more third party payers is responsible for paying comprises at least one of (a) comparing an insurance carrier listed on the received claim to a stored list of insurance carriers that exclusively function as third party payers, and (b) searching the database for previously received healthcare claims corresponding to the same patient identifier as the received claim, and determining if any such previously received claims are associated with a third party payer; and the electronic portal further configured to, based on the result of the duplicate claim edit or the third party liability edit, submit the received claim to a payer.

2. The system of claim 1, wherein the electronic portal is further configured to assign a unique identifier and a shared identifier to each of the plurality of data elements of the received claim; and wherein the electronic portal is further configured to provide the plurality of data elements and associated unique and shared identifiers to the database to be stored.

3. The system of claim 2, wherein the electronic portal is further configured to receive a remittance from a payer and split the received remittance into a plurality of data elements, the data elements comprising at least a patient identifier, a healthcare provider identifier, a date of service, and an amount being paid;

wherein the electronic portal is further configured to assign a unique identifier to each of the plurality of data elements of the received remittance;

wherein the electronic portal is further configured to assign the shared identifier to each of the plurality of data elements of the received remittance;

wherein the electronic portal is further configured to perform at least one of a duplicate remittance edit or a third party payment edit on the received remittance;

wherein the electronic portal is further configured to, based on the result of the duplicate remittance edit, submitting the received remittance to the healthcare provider; and wherein the electronic portal is further configured to store the plurality of data elements and associated unique and shared identifiers in the database.

4. The system of claim 3, wherein the electronic portal is further configured to set a status indicator for each of the plurality of data elements of the received remittance to indicate that the remittance has been submitted to the healthcare provider.

5. The system of claim 3, wherein performing the duplicate remittance edit comprises searching the database for a previously received remittance having a same patient identifier and a same date of service as the received remittance and having a status indicator indicative of having been submitted to the healthcare provider; and wherein the electronic portal is further configured to submit the received remittance to the healthcare provider only if the database does not contain a previously received remittance having the same patient identifier and the same date of service as the received remittance and having a status indicator indicative of having been submitted to the healthcare provider.

6. The system of claim 5, wherein the electronic portal is further configured to notify the payer if the database contains a previously received remittance having the same patient identifier and the same date of service as the received remittance and having a status indicator indicative of having been submitted to the healthcare provider.

7. The system of claim 3, wherein performing the third party payment edit comprises:

determining if any portion of the amount payable remains outstanding after receiving the remittance;

determining if one or more third party payers is responsible for paying the outstanding portion;

wherein the electronic portal is further configured to, if one third party payer is responsible for paying the outstanding portion, submit a claim for the outstanding portion to the one third party payer responsible for paying the outstanding portion; and wherein the electronic portal is further configured to, if two or more third party payers are responsible for paying the outstanding portion, submit a claim for the outstanding portion to the third party payer having primary responsibility to pay the outstanding portion.

8. The system of claim 1, wherein the electronic portal is further configured to set a status indicator for each of the plurality of data elements of the received claim to indicate that the claim has been submitted to the payer.

9. The system of claim 1, wherein performing the duplicate claim edit comprises searching the database for a previously received claim having a same patient identifier and a same date of service as the received claim and having a status indicator indicative of having been submitted to the payer; and wherein the electronic portal is further configured to submit the received claim to the payer only if the database does not contain a previously received claim having the same patient identifier and the same date of service as the received claim and having a status indicator indicative of having been submitted to the payer.

10. The system of claim 9, wherein the electronic portal is further configured to notify the healthcare provider if the database contains a previously received claim having the same patient identifier and the same date of service as the received claim and having a status indicator indicative of having been submitted to the payer.

11. The system of claim 1, wherein performing the third party liability edit further comprises:

if at least two third party payers are responsible for paying a portion of the amount payable associated with the received claim, determining which of the third party payers is a primary payer and which is a secondary payer; and if at least three third party payers are responsible for paying a portion of the amount payable associated with the received claim, determining which of the third party payers is a tertiary payer;

wherein submitting the received claim to a payer comprises submitting the received claim to the primary payer.

12. The system of claim 1, wherein the electronic portal is further configured to receive missing data from the healthcare provider and split the received missing data into a plurality of data elements; wherein the electronic portal is further configured to assign a unique identifier to each of the plurality of data elements of the missing data; and wherein the electronic portal is further configured to assign the previously assigned shared identifier to each of the plurality of data elements of the missing data.

13. The system of claim 1, wherein the electronic portal is further configured to resubmit the received claim to the payer and notify the healthcare provider of the resubmission if a predetermined amount of time has elapsed since the received claim was submitted to the payer.

14. A method for processing healthcare claims and remittances, the method comprising:
providing a database, stored in a memory device, of previously received healthcare claims from a plurality of healthcare providers and previously received remittances from a plurality of payers;
receiving a healthcare claim from a healthcare provider;
splitting the received claim into a plurality of data elements, the data elements comprising at least a patient identifier, a healthcare provider identifier, a date of service, and an amount payable;
determining if any necessary data is missing from the received claim and sending a missing data request to the healthcare provider;
performing a duplicate claim edit and a third party liability edit on the received claim with a computer processing unit, wherein the third party liability edit comprises determining if one or more third party payers is responsible for paying at least a portion of the amount payable associated with the received claim, and wherein determining if the one or more third party payers is responsible for paying comprises at least one of (a) comparing an insurance carrier listed on the received claim to a stored list of insurance carriers that exclusively function as third party payers; and (b) searching the database for previously received healthcare claims corresponding to the same patient identifier as the received claim, and determining if any such previously received claims are associated with a third party payer; and
based on the result of the duplicate claim edit or the third party liability edit, submitting the received claim to a payer.

15. The method of claim 14, wherein the method further comprises: assigning a unique identifier and a shared identifier to each of the plurality of data elements of the received claim; and storing the plurality of data elements and associated unique and shared identifiers in the database.

16. The method of claim 15, further comprising:
receiving a remittance from a payer;
splitting the received remittance into a plurality of data elements, the data elements comprising at least a patient identifier, a healthcare provider identifier, a date of service, and an amount being paid;
assigning a unique identifier to each of the plurality of data elements of the received remittance;
assigning the shared identifier to each of the plurality of data elements of the received remittance;
performing at least one of a duplicate remittance edit and a third party payment edit on the received remittance;
based on the result of the duplicate remittance edit, submitting the received remittance to the healthcare provider; and
storing the plurality of data elements and associated unique and shared identifiers in the database.

17. The method of claim 16, wherein the method further comprises: setting a status indicator for each of the plurality of data elements of the received remittance to indicate that the remittance has been submitted to the healthcare provider.

18. The method of claim 16, wherein performing the duplicate remittance edit comprises searching the database for a previously received remittance having a same patient identifier and a same date of service as the received remittance and having a status indicator indicative of having been submitted to the healthcare provider; and wherein the received remittance is submitted to the healthcare provider only if the database does not contain a previously received remittance having the same patient identifier and the same date of service as the received remittance and having a status indicator indicative of having been submitted to the healthcare provider.

19. The method of claim 18, wherein the method further comprises: notifying the payer if the database contains a previously received remittance having the same patient identifier and the same date of service as the received remittance and having a status indicator indicative of having been submitted to the healthcare provider.

20. The method of claim 16, wherein performing the third party payment edit comprises:
determining if any portion of the amount payable remains outstanding after receiving the remittance;
determining if one or more third party payers is responsible for paying the outstanding portion;
and wherein the method further comprises:
if one third party payer is responsible for paying the outstanding portion, submitting a claim for the outstanding portion to the one third party payer responsible for paying the outstanding portion; and
if two or more third party payers are responsible for paying the outstanding portion, submitting a claim for the outstanding portion to the third party payer having primary responsibility to pay the outstanding portion.

21. The method of claim 14, wherein the method further comprises: setting a status indicator for each of the plurality of data elements of the received claim to indicate that the claim has been submitted to the payer.

22. The method of claim 14, wherein performing the duplicate claim edit comprises searching the database for a previously received claim having a same patient identifier and a same date of service as the received claim and having a status indicator indicative of having been submitted to the payer; and wherein the received claim is submitted to the payer only if the database does not contain a previously received claim having the same patient identifier and the same date of service as the received claim and having a status indicator indicative of having been submitted to the payer.

23. The method of claim 22, wherein the method further comprises:
notifying the healthcare provider if the database contains a previously received claim having the same patient identifier and the same date of service as the received claim and having a status indicator indicative of having been submitted to the payer.

24. The method of claim 14, wherein performing the third party liability edit further comprises:
if at least two third party payers are responsible for paying a portion of the amount payable associated with the received claim, determining which of the third party payers is a primary payer and which is a secondary payer; and
if at least three third party payers are responsible for paying a portion of the amount payable associated with the received claim, determining which of the third party payers is a tertiary payer;
wherein submitting the received claim to a payer comprises submitting the received claim to the primary payer.

25. The method of claim 14, further comprising:
receiving missing data from the healthcare provider;
splitting the received missing data into a plurality of data elements; assigning a unique identifier to each of the plurality of data elements of the missing data; and
assigning the previously assigned shared identifier to each of the plurality of data elements of the missing data.

26. The method of claim 14, further comprising: resubmitting the received claim to the payer and notifying the healthcare provider of the resubmission if a predetermined amount of time has elapsed since the received claim was submitted to the payer.

27. A computer program product for processing healthcare claims and remittances, the computer program product comprising at least one computer-readable storage medium having computer-readable program code portions stored therein, the computer-readable program code portions comprising:
a first executable portion capable of providing a database of previously received healthcare claims from a plurality of healthcare providers and previously received remittances from a plurality of payers;
a second executable portion capable of receiving a healthcare claim from a healthcare provider;
a third executable portion capable of splitting the received claim into a plurality of data elements, the data elements comprising at least a patient identifier, a healthcare provider identifier, a date of service, and an amount payable;
a fourth executable portion capable of performing a duplicate claim edit and a third party liability edit on the received claim, wherein the third party liability edit comprises determining if one or more third party payers is responsible for paying at least a portion of the amount payable associated with the received claim, and wherein determining if the one or more third party payers is responsible for paying comprises at least one of (a) comparing an insurance carrier listed on the received claim to a stored list of insurance carriers that exclusively function as third party payers; and (b) searching the database for previously received healthcare claims corresponding to the same patient identifier as the received claim, and determining if any such previously received claims are associated with a third party payer; and
a fifth executable portion capable of, based on the result of the duplicate claim edit or the third party liability edit, submitting the received claim to a payer
an sixth executable portion capable of determining if any necessary data is missing from the received claim; and
a seventh executable portion capable of sending a missing data request to the healthcare provider.

28. The computer program product of claim 27, further comprising:
a sixth executable portion capable of assigning a unique identifier and a shared identifier to each of the plurality of data elements of the received claim; and
a seventh executable portion capable of storing the plurality of data elements and associated unique and shared identifiers in the database.

29. The computer program product of claim 28, further comprising:
an eighth executable portion capable of receiving a remittance from a payer;
a ninth executable portion capable of splitting the received remittance into a plurality of data elements, the data elements comprising at least a patient identifier, a healthcare provider identifier, a date of service, and an amount being paid;
a tenth executable portion capable of assigning a unique identifier to each of the plurality of data elements of the received remittance;
an eleventh executable portion capable of assigning the shared identifier to each of the plurality of data elements of the received remittance;
a twelfth executable portion capable of performing at least one of a duplicate remittance edit and a third party payment edit on the received remittance;
a thirteenth executable portion capable of, based on the result of the duplicate remittance edit, submitting the received remittance to the healthcare provider; and
a fourteenth executable portion capable of storing the plurality of data elements and associated unique and shared identifiers in the database.

30. The computer program product of claim 29, further comprising:
a fifteenth executable portion capable of setting a status indicator for each of the plurality of data elements of the received remittance to indicate that the remittance has been submitted to the healthcare provider.

31. The computer program product of claim 29, wherein performing the duplicate remittance edit comprises searching the database for a previously received remittance having a same patient identifier and a same date of service as the received remittance and having a status indicator indicative of having been submitted to the healthcare provider; and wherein the received remittance is submitted to the healthcare provider only if the database does not contain a previously received remittance having the same patient identifier and the same date of service as the received remittance and having a status indicator indicative of having been submitted to the healthcare provider.

32. The computer program product of claim 31, further comprising:
a fifteenth executable portion capable of notifying the payer if the database contains a previously received remittance having the same patient identifier and the same date of service as the received remittance and having a status indicator indicative of having been submitted to the healthcare provider.

33. The computer program product of claim 29, wherein performing the third party payment edit comprises:
determining if any portion of the amount payable remains outstanding after receiving the remittance;
determining if one or more third party payers is responsible for paying the outstanding portion;
wherein, if one third party payer is responsible for paying the outstanding portion, the thirteenth executable portion submits a claim for the outstanding portion to the one third party payer responsible for paying the outstanding portion; and
wherein if two or more third party payers are responsible for paying the outstanding portion, the thirteenth executable portion submits a claim for the outstanding portion to the third party payer having primary responsibility to pay the outstanding portion.

34. The computer program product of claim 27, further comprising:
an eighth executable portion capable of setting a status indicator for each of the plurality of data elements of the received claim to indicate that the claim has been submitted to the payer.

35. The computer program product of claim 27, wherein performing the duplicate claim edit comprises searching the database for a previously received claim having a same patient identifier and a same date of service as the received claim and having a status indicator indicative of having been submitted to the payer; and wherein the fifth executable portion submits the received claim to the payer only if the database does not contain a previously received claim having the same patient identifier and the same date of service as the received claim and having a status indicator indicative of having been submitted to the payer.

36. The computer program product of claim 35, further comprising:
 a sixth executable portion capable of notifying the healthcare provider if the database contains a previously received claim having the same patient identifier and the same date of service as the received claim and having a status indicator indicative of having been submitted to the payer.

37. The computer program product of claim 27, wherein performing the third party liability edit further comprises:
 if at least two third party payers are responsible for paying a portion of the amount payable associated with the received claim, determining which of the third party payers is a primary payer and which is a secondary payer; and
 if at least three third party payers are responsible for paying a portion of the amount payable associated with the received claim, determining which of the third party payers is a tertiary payer;
wherein submitting the received claim to a payer comprises submitting the received claim to the primary payer.

38. The computer program product of claim 27, further comprising:
 a tenth executable portion capable of receiving missing data from the healthcare provider;
 a eleventh executable portion capable of splitting the received missing data into a plurality of data elements;
 a twelfth executable portion capable of assigning a unique identifier to each of the plurality of data elements of the missing data; and
 a thirteenth executable portion capable of assigning the previously assigned shared identifier to each of the plurality of data elements of the missing data.

39. The computer program product of claim 27, further comprising:
 a sixth executable portion capable of resubmitting the received claim to the payer and notifying the healthcare provider of the resubmission if a predetermined amount of time has elapsed since the received claim was submitted to the payer.

\* \* \* \* \*

UNITED STATES PATENT AND TRADEMARK OFFICE
CERTIFICATE OF CORRECTION

| | | |
|---|---|---|
| PATENT NO. | : 8,364,498 B2 | Page 1 of 1 |
| APPLICATION NO. | : 11/511658 | |
| DATED | : January 29, 2013 | |
| INVENTOR(S) | : James M. Sohr et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1273 days.

Signed and Sealed this
Eighteenth Day of November, 2014

Michelle K. Lee
*Deputy Director of the United States Patent and Trademark Office*